(12) United States Patent
Farrow et al.

(10) Patent No.: US 11,418,644 B2
(45) Date of Patent: Aug. 16, 2022

(54) SYSTEMS AND METHODS FOR CREATING MULTITRACK RECORDINGS

(71) Applicant: NEXMO, INC., San Francisco, CA (US)

(72) Inventors: Jonathan Farrow, London (GB); Dragos Oancea, London (GB)

(73) Assignee: Vonage Business Inc., Atlanta, GA (US)

( * ) Notice: Subject to any disclaimer, the term of this patent is extended or adjusted under 35 U.S.C. 154(b) by 123 days.

(21) Appl. No.: 16/457,183

(22) Filed: Jun. 28, 2019

(65) Prior Publication Data
US 2020/0059554 A1 Feb. 20, 2020

Related U.S. Application Data

(60) Provisional application No. 62/764,862, filed on Aug. 17, 2018.

(51) Int. Cl.
*H04M 3/42* (2006.01)
*G11B 20/10* (2006.01)
*G06F 3/16* (2006.01)
*H04M 3/56* (2006.01)

(52) U.S. Cl.
CPC ........ *H04M 3/42221* (2013.01); *G06F 3/165* (2013.01); *G11B 20/10527* (2013.01); *H04M 3/568* (2013.01)

(58) Field of Classification Search
CPC .............. H04M 3/42221; H04M 3/568; G11B 20/10527
USPC ....................................... 379/88.01
See application file for complete search history.

(56) References Cited

U.S. PATENT DOCUMENTS

| | | | | |
|---|---|---|---|---|
| 6,850,609 | B1* | 2/2005 | Schrage | G10L 15/26 704/235 |
| 8,135,115 | B1* | 3/2012 | Hogg, Jr. | H04M 1/64 379/88.19 |
| 2003/0169330 | A1* | 9/2003 | Ben-Shachar | H04N 7/152 348/14.09 |

* cited by examiner

*Primary Examiner* — Amal S Zenati
(74) *Attorney, Agent, or Firm* — FisherBroyles, LLP; Joseph Pagnotta

(57) ABSTRACT

Systems and methods for making a multitrack recording of a telephony communication, such as a conference call, record the contributions of each participant its own respective, separate recording track. In some instances, the contribution(s) of one or more participants is recorded in separate recording tracks, and the contributions of multiple other participants is mixed and recorded in a single recording track. An organizer or administrator of a telephony communication, such as a conference call, can instruct a multitrack recording system as to how to format a multitrack recording of the telephony communication via commands submitted through an application programming interface (API).

12 Claims, 8 Drawing Sheets

SYSTEMS AND METHODS FOR CREATING MULTITRACK RECORDINGS

This application claims priority to the filing date of U.S. Provisional Application No. 62/764,862, which was filed Aug. 17, 2019, the contents of which are hereby incorporated by reference.

BACKGROUND OF THE INVENTION

The invention is related to system and methods for generating multitrack recordings of telephony communications, such as telephone calls and conference calls.

While many conference call services allow one to record the conference call, typically the mixed audio of all participants is what is recorded. If one wishes to create a transcription of what each participant said, it is sometimes difficult to separate the spoken contributions of each participant so that what each participant said is attributed to the proper party. This is particularly true, when one attempts to use speech recognition based software applications to create such transcriptions.

Moreover, it is sometimes desirable to review a recording of a conference call to create a transcription of what only a single participant said. here again, it is quite difficult for transcription software applications to identify the spoken contributions of only a single party.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

The invention relates to systems and methods for making multitrack recordings of telephony communications, such as conference calls. For purposes of the following description and claims, a "telephony communication" could include a telephone call or an audio conference call, a video call or a video conference, as well as other forms of audio or video communications. Moreover, a telephony communication could include audio, video and also various text-based communications. The text-based communications could include text messages, private textual messages that are exchanged between two or more participants of the telephony communication, and other forms of textual communications.

The following description and claims refer to recording one or more participants' contributions to a telephony communication. Each participant's contribution could be spoken audio or other sounds that the participant contributed, a video feed that may include audio sounds, as well as any text-based messages that the participant contributed and which were seen by some or all the participants.

Figure 1:
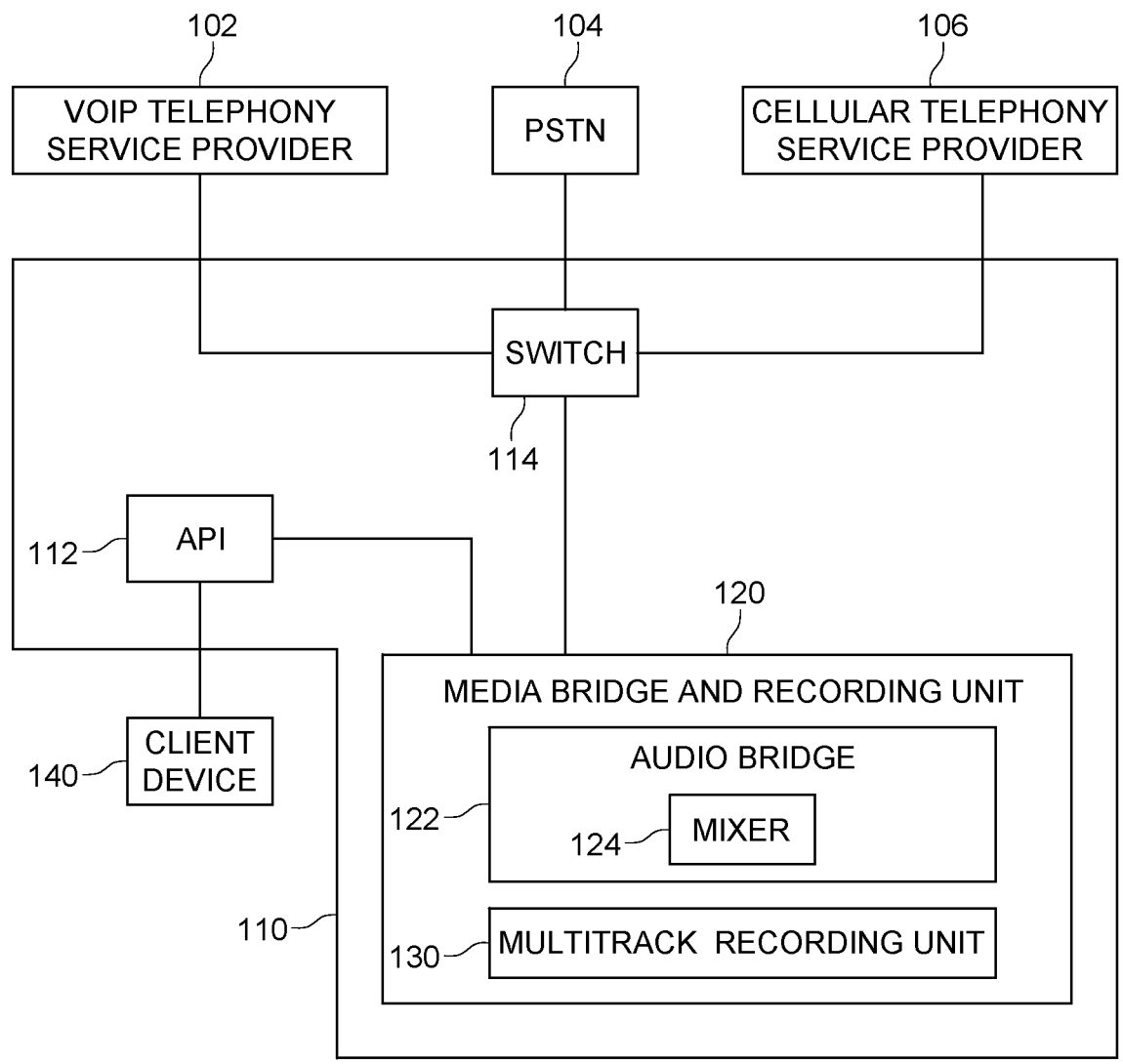
FIG. 1 is a diagram of a first communications environment which could be utilized to perform methods embodying the invention.

Before describing systems and methods embodying the invention, we will first discuss a communications environment 100, as illustrated in FIG. 1, in which the inventive systems could exist and in which the inventive methods could be performed.

As shown in FIG. 1, a VOIP telephony service provider 102, a Publicly Switched Telephone Network (PSTN) 104 and a cellular telephony service provider 106 are all connected to a switch 114 of a telephony services provider 110. The switch 114 connects incoming telephone calls and outgoing telephone calls that are carried by the VOIP telephony service provider 102, PSTN 104 and/or a cellular telephony service provider 106 to a media bridge and recording unit 120. Of course, communications links to participants could be established in other ways as well. The communications links between participants and the media bridge and recording unit 120 could carry just audio, or audio and video, as well as textual-based messages.

The media bridge and recording unit 120 includes an audio bridge 122, which itself includes an audio mixer 124. Also included is a multitrack recording unit 130.

The telephony services provider 110 also includes an Application Programming Interface (API) 112 which can be used by customers of the telephony services provider 110 to interact with the telephony services provider 110. A customer, using a client device 140, can use the API 112 to issue commands that the telephony services provider 110 then acts upon. In addition, the API 112 can be used by customers to request information and data from the telephony services provider 110. Moreover, APIs can be used to programmatically customize or add features that the customer may want in their telephony services. For example, these interfaces provide simple and scalable solutions to extending voice and/or messaging services to environments where they did not typically exist, such as websites and smartphone applications.

The client device 140 could be a desktop or laptop computer, a tablet, a smartphone or virtually any other sort of computing device that enables the customer to interact with the API 112 provided by the telephony services provider 110.

Figure 2:
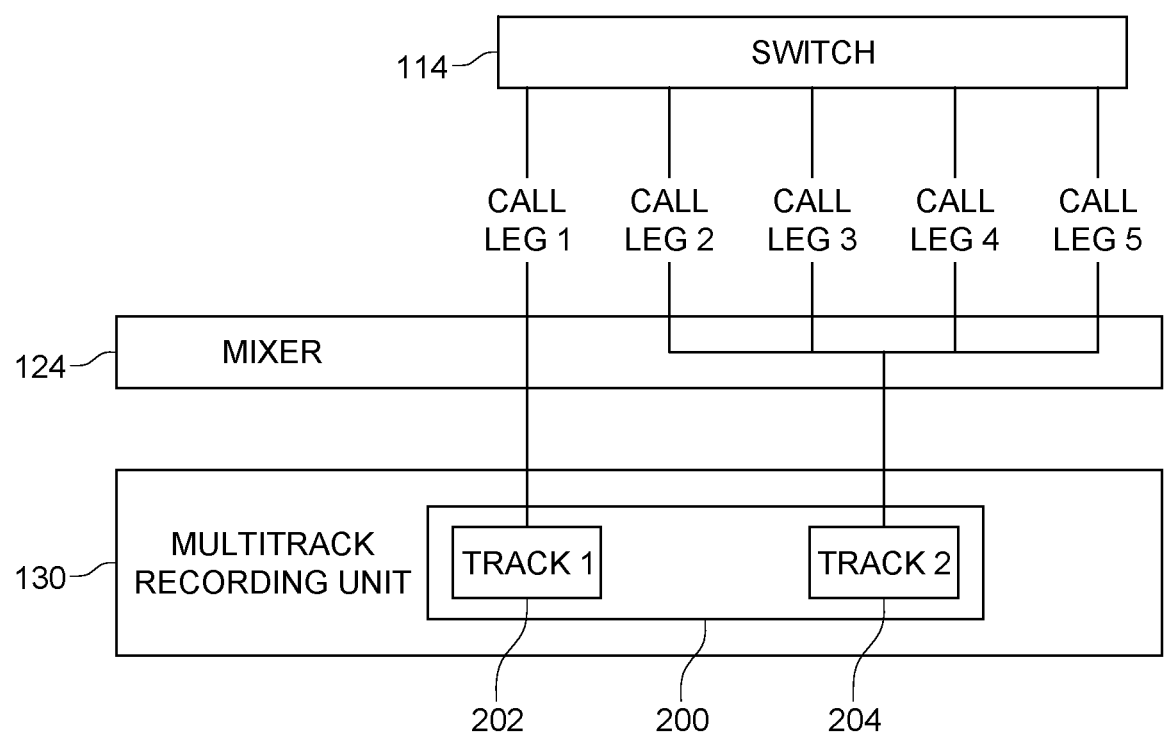
FIG. 2 is a first diagram of elements of a system for creating a multitrack recording.

As illustrated in FIG. 2, the multitrack recording unit 130 can create multitrack recordings 200 that include a plurality of recording tracks 202, 204. Each recording track 202, 204 is a separate recording. However, the recording tracks may include synchronization or timing data so that a particular portion of the data in a first recording track 202 can be synchronized with the data in a corresponding portion of the second recording track 204.

The following description will discuss how the audio of a conference call can be recorded in multiple separate tracks of a multitrack recording. However, systems and methods embodying the invention are not limited to simply recording the audio of a conference call. As noted above, a participant's contribution to a telephony communication could include audio, video, as well as text-based messages. Thus, the following descriptions, which primarily focus on recording the audio of a conference call, should in no way be considered limiting of the claimed invention.

Figure 4:
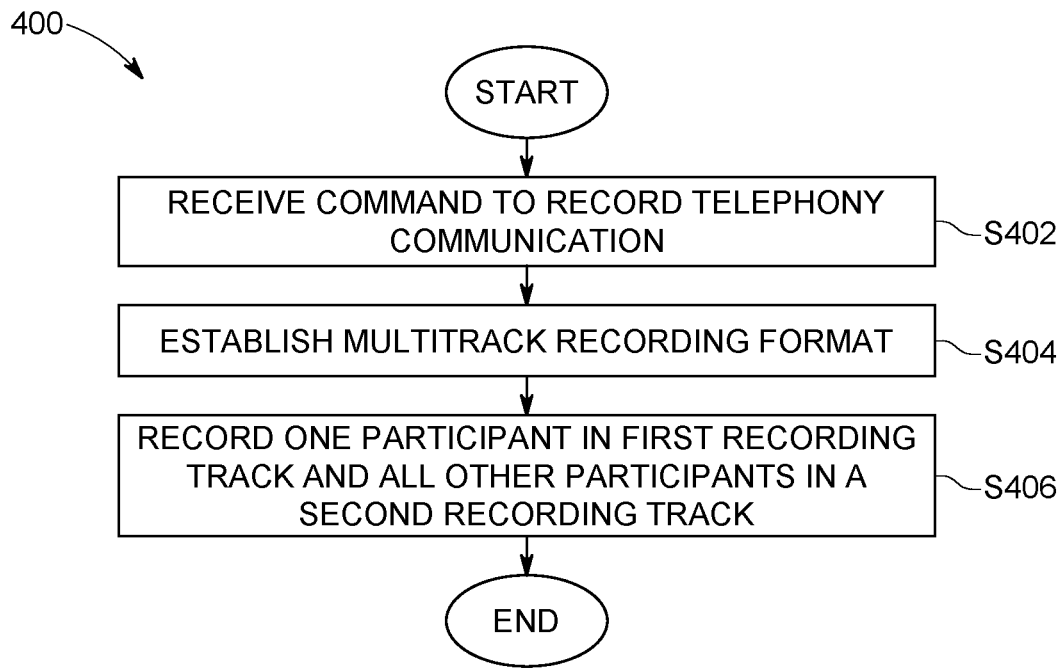
FIG. 4 is a flow chart showing steps of a first method for making a multitrack recording.

FIG. 4 illustrates the steps of a first method 400 embodying the invention. A discussion of this method is provided below in conjunction with what is shown in FIGS. 1, 2 and 4.

The method 400 begins and proceeds to step S402, where the API 112 of a telephony services provider 110 receives a command from a customer to record the audio of a conference call in a multitrack recording 200. The command could specify that the audio contributions of a specific participant are to be recorded in a first track 202 of the multitrack recording 200, and that the audio contributions of all other participants are to be mixed and recorded in a second track 204 of the multitrack recording 200. The command received via the API 112 could include a call control object, and one aspect or portion of the call control object could specify how the multitrack recording is to be formatted.

In some embodiments, the participant whose audio contributions are to be recorded in the first track 202 of the multitrack recording 200 may be identified via a participant identification code. In some embodiments, the participant identification codes of the various participants are assigned as the participants join the conference call. In other embodiments, the participant identification codes could be established in a different fashion.

In other embodiments, the participant whose audio contributions are to be recorded in the first track 202 of the multitrack recording 200 may be identified in some other fashion. For example, the participant could be identified by the telephone number of the telephony device that the participant will use to access the conference call. When the participant calls in to join the conference call, via the switch 114, this information will be included in Caller ID information that is provided during call setup. In this instance, the command received from the customer via the API 112 would include the participant's telephone number. The switch 114 receives the telephone number of each calling party as part of the caller ID information, so the switch 114 is able to identify which audio stream corresponds to the telephone number provided in the client's recording command. The switch 114 then informs either or both of the mixer 124 and multitrack recording unit 130 about which audio stream to record separately in a first recording track 202.

Caller ID information often includes the name of the party that placed a call. As such, the participant's name could also be used to identify the participant whose audio contributions are to be recorded in the first track 202 of the multitrack recording 200. In this instance, similar to the telephone number example given immediately above, the switch 114 identifies the audio stream belonging to the identified participant and communicate this information to either or both of the mixer 124 and the multitrack recording unit 130.

In still other embodiments, when the customer interacts with the API 112 to request that the conference call be recorded in a particular way, the API 112 may provide the customer with an identification code that is to be used by the participant whose contributions are to be recoded separately. When that participant joins the conference call, the participant will supply the identification code, which signals that that participant's contributions are to be recorded separately.

The above examples are just a few of the ways in which the audio stream which is to be recorded separately can be identified in the customer command received via the API 112. Other ways of identifying the participant whose audio contributions are to be recorded separately in the first track 202 of the multitrack recording 200 could also be used.

The method then proceeds to step S404, where the multitrack recording unit 130 formats a multitrack recording 200 that will be used to record the conference call. In this instance, the customer's command received via the API 112 specifies that the conference call is to be recorded in a two track recording. In response, the multitrack recording unit 130 establishes a multitrack recording 200 with a first recording track 202 and a second recording track 204, as illustrated in FIG. 2. As shown in FIG. 2, call leg 1 from the identified participant is routed to the first track 202 of the multitrack recording 200. Call legs 2, 3, 4 and 5 from four other conference call participants are combined in the mixer 124 and the combined audio is routed to the second track 204 of the multitrack recording 200.

The method then proceeds to step S406, where the multitrack recording unit 130 records the audio contributions of the identified participant in the first recording track 202, and where the audio contributions of all other participants are combined in the mixer 124, and then recorded in the second recording track 204.

Each time that a participant leaves the conference call, audio from that participant's associated call leg is silenced. The method ends when the last participant leaves the conference. Thus, if the participant whose audio contributions are being recorded in the first track 202 of the multitrack recording 200 were to leave the conference call before it ends, the multitrack recording would continue to record the audio contributions of the other participants in the second track 204 of the multitrack recording 200 until the conference call ends.

Figure 5:
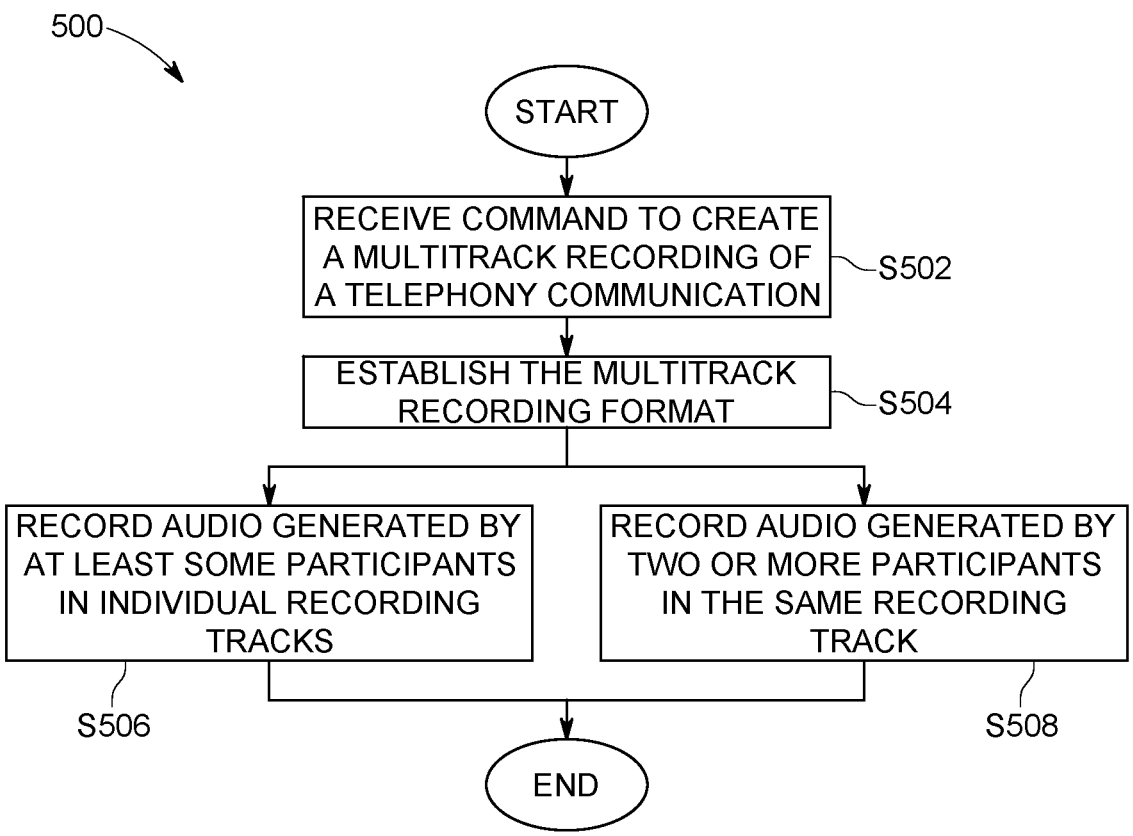
FIG. 5 is a flow chart showing steps of a second method for making a multitrack recording.

A second method embodying the invention is described below with references to FIGS. 1, 3 and 5. FIG. 5 illustrates the steps of a method 500 in which the audio contributions of multiple participants are recorded separately in respective recording tracks of a multitrack recording, and in which the audio contributions of two or more participants are combined in a mixer, and recorded in a single recording track.

The method 500 begins and proceeds to step S502, where a command is received from a customer to record a conference call in a multitrack recording. Here again, the command could be received via the API 112, or via various other means. The command would indicate that the contributions of multiple participants are to be recorded in separate recording tracks of a multitrack recording.

In some instances, the command received from the customer could specify that only the audio contributions of specific participants are to be recorded in separate recording tracks, and that the audio contributions of all other participants are to be combined and recorded in a single recording track. The participants whose audio contributions are to be recorded in separate recording tracks could be identified in any of the ways discussed above.

In other instances, the command received from the customer could specify that the audio contributions of all participants are to be recorded in separate recording tracks.

In still other instances, the command received from the customer could indicate that the first n participants to join the conference call are to be recorded in separate recording tracks, and that the audio contributions of all the other participants are to be combined and recorded in a single recording track. Under those circumstances, there would be a total of n+1 recording tracks in the multitrack recording.

In some instances there may be an upper limit to the number of recording tracks that are available in a multitrack recording. Limits on the number of individual recording tracks that are available may be imposed by hardware limitations or by file format limitations. As a result of such limitations, there may be only X number of recording tracks available in a multitrack recording. Under those circumstances, the command received from the customer could specify that the audio contributions of the first X−1 participants to join the conference call should be recorded in separate recording tracks, and that the audio contributions of the remaining participants should be combined and recorded in the last recording track.

Moreover, in instances where there are a limited number of recording tracks, the customer command could specify that the audio contributions of specific participants are to be recorded in separate recording tracks. If additional recording tracks are available, the audio contributions of additional participants could also be recorded in separate recording tracks. However, the last available recording track would be reserved for a combination of the audio contributions of those participants that could not be recorded in separate recording tracks due to the limited number of recording tracks that are available.

The method then proceeds to step S504, where the multitrack recording unit 130 sets up a multitrack recording that will be used to record the conference call. Depending on what the customer's command specifies, the multitrack recording could be setup to have various different numbers of recording tracks. In some embodiments, it may be necessary to configure the multitrack recording from the beginning with a sufficient number of recording tracks to handle the audio contributions of all anticipated participants. In other embodiments, it may be possible to add additional recording tracks to the multitrack recording as more and more participants join the conference call so that the audio contributions of all participants can be recorded in respective separate recording tracks. However, as noted above, the last available recording track would be reserved for a combination of the audio contributions of those participants that could not be recorded in individual recording tracks.

The method then proceeds approximately simultaneously to steps S506 and S508. In step S506, the audio contributions of those participants that are to be recorded separately are recorded in respective separate recording tracks of the multitrack recording. In the diagram illustrated in FIG. 3, the audio contributions of four participants are separately recorded in respective recording tracks 302, 304, 306 and 308 of the multitrack recording 300.

Approximately simultaneously, in step S508, the audio contributions of two or more participants are combined in a single recording track 310 of the multitrack recording 300. For example, audio from two participants received over call legs 5 and 6 is combined in the mixer 124, and the combined audio is recorded on recording track 310.

As each participant leaves the conference call, audio from that participant's call leg is silenced. The method ends when the last participant leaves the conference call.

Figure 6:
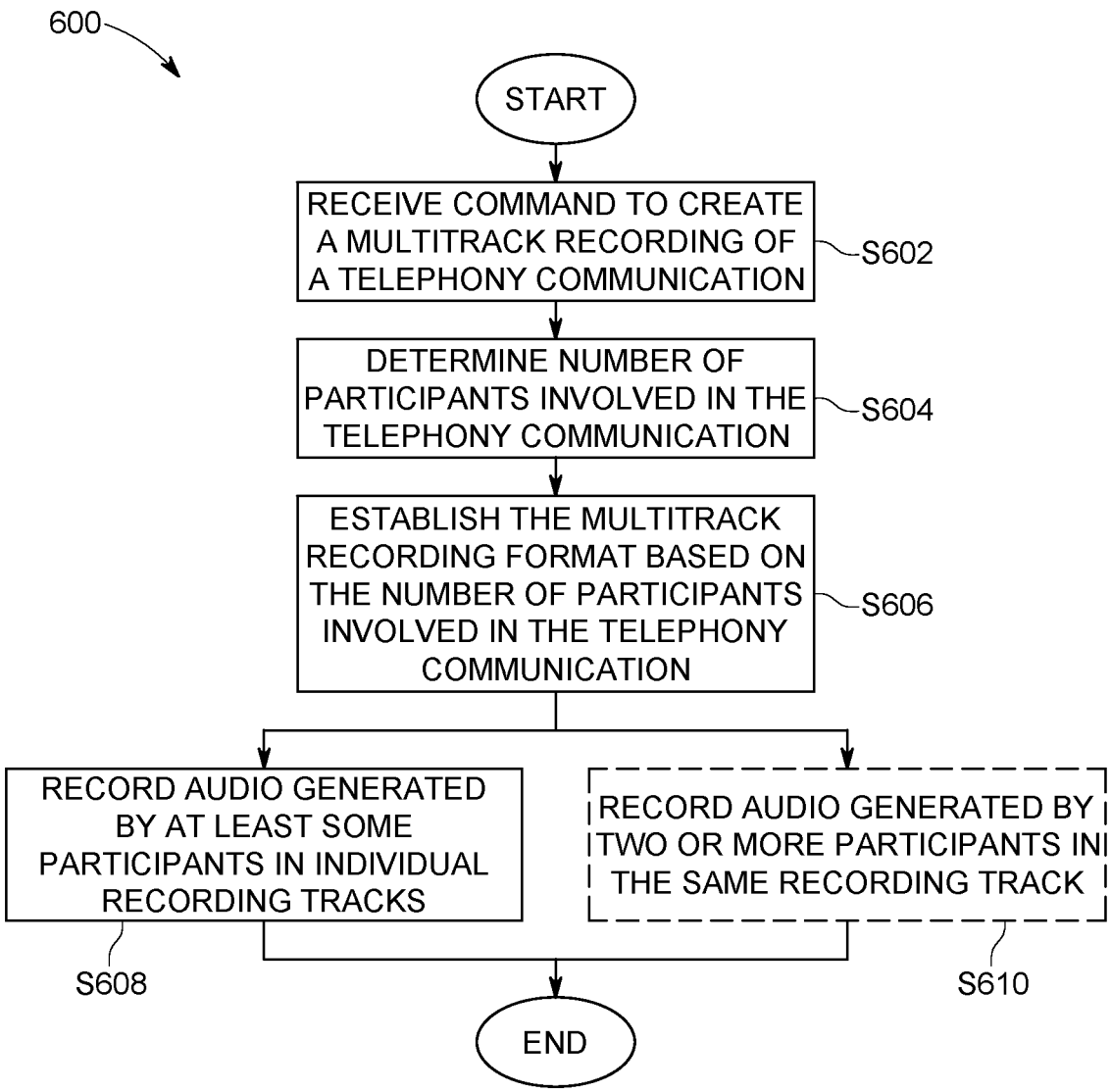
FIG. 6 is a flowchart illustrating steps of a third method for making a multitrack recording.

A third method 600 embodying the invention is described below with references to FIGS. 1, 3 and 6. In this method 600, the number of participants in the conference call is determined at the start of the conference call, and that number is used to format a multitrack recording that will be used to record the conference call.

The method 600 begins and proceeds to step S602, where a command is received from a customer to make a multitrack recording of a telephony communication, such as a conference call. The method proceeds to step S604, where the number of participants in the telephony communication is determined. In the case of a conference call, this could include waiting for all participants to join the conference call, at which point the total number of participants would be known. In other instances, one could check an invitation that was sent out to potential participants to determine the total number of people that were invited to join the telephony communication. The total number of invitees would then be used to establish the number of participants. In other instances, the total number of participants could be determined in alternate ways.

The method then proceeds to step S606, where the multitrack recording unit 130 establishes the format of the multitrack recording, and in particular, the number of recording tracks that will be included in the multitrack recording. In some instances, the number of different recording tracks will equal the number of participants determined in step S604. In other instances, the number of recording tracks could equal the number of participants determined in step S604, plus 1. The extra recording track would be used to record the audio contributions of any additional unexpected participants that end up joining the telephony communication. If multiple unexpected participants join the telephony communication, the audio contributions of all the unexpected participants would be combined and recorded in the extra additional recording track.

The method then proceeds approximately simultaneously to steps S608, and possibly step S610. In step S608, the audio contributions of at least some participants is recorded in respective separate recording tracks. Approximately simultaneously, in step S610, the audio contributions of two or more participants could be combined and recorded in a single recording track. S610 is an optional step that would only be performed if the customer's command received in step S602 directs that this occur, or in circumstances where multiple unexpected participants join the telephony communication, and there are not a sufficient number of individual recording tracks such that all participants can be recorded in their own separate track. Step S610 might also be necessary where limitations on the number of available recording tracks make it impossible for all participants to be recorded in their own separate track.

The method ends when the last participant leaves the telephony communication.

Figure 7:
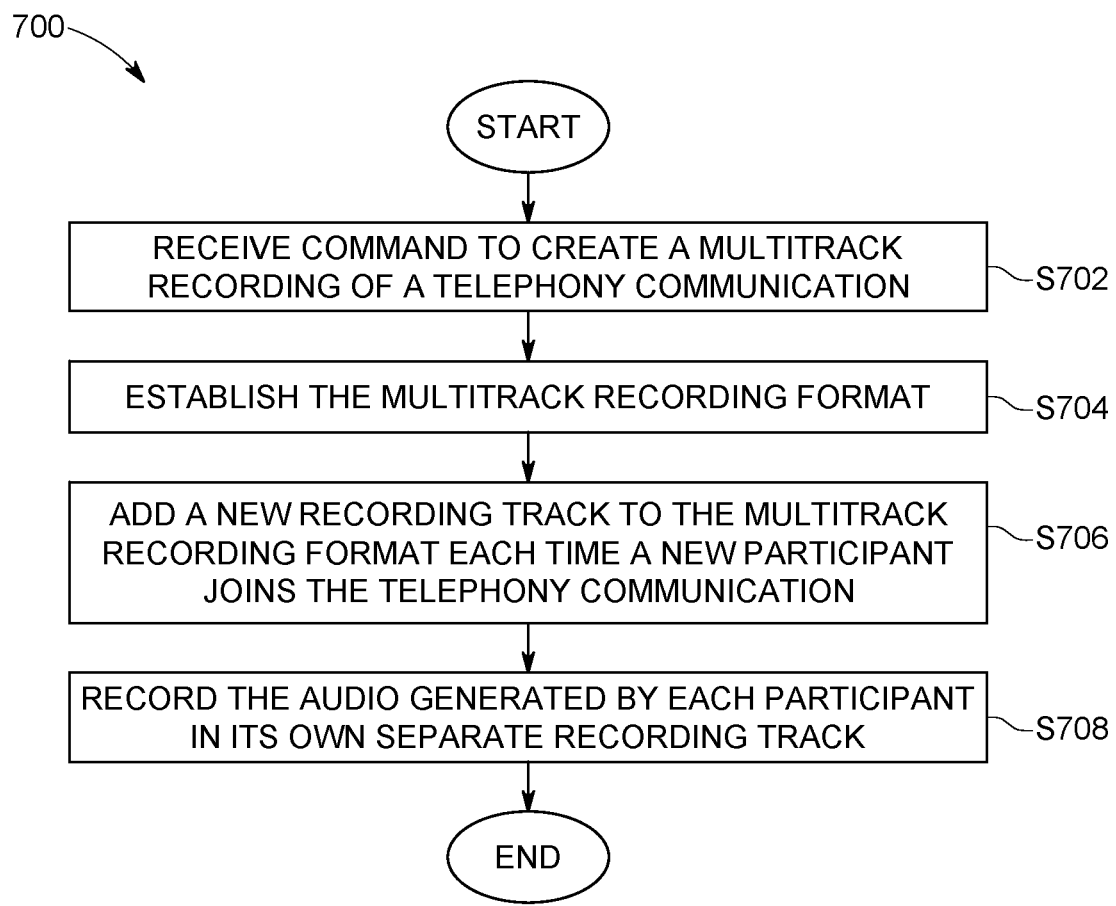
FIG. 7 is a flowchart illustrating steps of a fourth method for making a multitrack recording.

A fourth method 700 embodying the invention is described below with references to FIGS. 1, 3 and 7. In this method, additional recording tracks are added to a multitrack recording that is already in progress as more and more participants join an ongoing telephony communication.

The method 700 begins and proceeds to step S702, where a command is received to create a multitrack recording of a telephony communication. In step S704, the multitrack recording unit 130 establishes a multitrack recording that will be used to record the telephony communication, and it is one that is capable of adding recording tracks after the recording begins.

In step S706, after the telephony communication has begun, an additional recording track is added to the multitrack recording 200 each time that a new participant joins the telephony communication so that the new participant's contributions to the telephony communication can be recorded in that new recording track. As part of the process, a check may be performed on a regular periodic basis to determine if any new participants have joined the conference call, and to determine if any participants have left the conference call. Information about who is presently a participant can be obtained from the switch 114 and/or the mixer 124.

For example, assume that a check of the current conference call participants is performed every 20 ms. Each time that the check is performed, the current list of participants can be compared to the list of participants acquired during the previous check to determine if a new participant has joined the conference call and to determine if a participant has left the conference call. If a new participant has joined the conference call, during step S706 a new recording track would be added to the multitrack recording so that the newly joined participant's audio contributions can be recorded in the new recording track. Similarly, if a comparison of the current participants to the participants that existed during the previous check indicates that a participant has left the conference call, the recording track for the participant that left can be silenced for the remainder of the conference call.

In step S708, each participants' contribution to the telephony communication is recorded in a separate track of the multitrack recording. The method ends when the last participant leaves the telephony communication.

Figure 3:
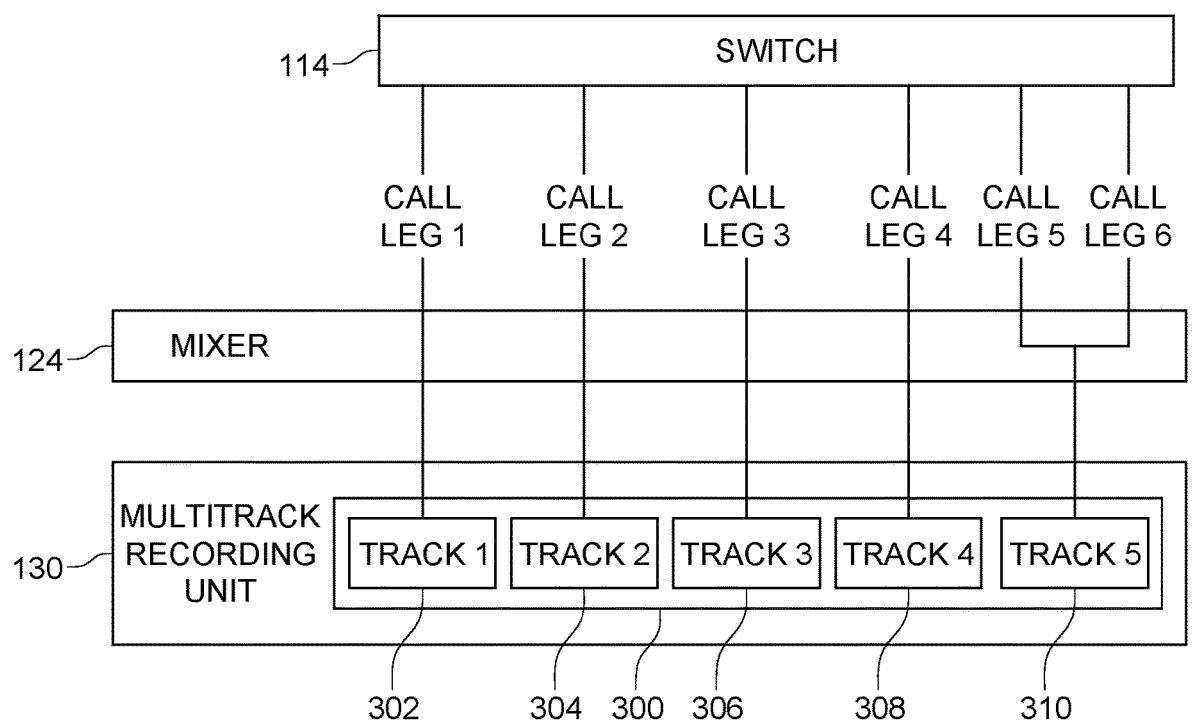
FIG. 3 is a second diagram of elements of a system for creating a multitrack recording.

With reference to FIG. 3, the method 700 described above in connection with FIG. 7 might begin with only two participants on a conference call bridge. The first and second participants' audio contributions to the conference call would be received through the switch 114 on call legs 1 and 2, respectively. At this point in time, the multitrack recording 300 would only include a first recording track 302 that is used to record the first participant's audio contributions, and a second recording track 304, which is used to record the second participant's contributions to the conference call.

As the conference call continues, a third participant would join the conference call. When the third participant joins the conference call, the multitrack recording unit 130 would add a third recording track 306 to the multitrack recording 300, and the third participant's audio contributions, received over call leg 3, would be recorded in the third recording track 306. The same process is repeated when fourth and fifth participants join the conference call, and fourth and fifth recording tracks 308 and 310 are added to the multitrack recording 300 to record the fourth and fifth participants' contributions to the conference call received over call legs 4 and 5, respectively.

If the multitrack recording is limited to only five recording tracks, as illustrated in FIG. 3, when a sixth participant joins the conference call, the audio contributions of the fifth and sixth participants would be combined in the mixer 124, and the combined audio contributions of the fifth and sixth participants, received over call legs 5 and 6, respectively, would be recorded in the fifth recording track 310. If additional participants thereafter join the conference call, the audio contributions of those additional participants would also be combined with the audio contributions of the fifth and sixth participants in the mixer 124, and the combined audio contributions would be recorded in the fifth recording track 310.

When the audio contributions of multiple conference call participants are recorded separately, it is easy to generate individual transcriptions of what each participant said during the course of the conference call. One could create such transcripts by submitting the individual recordings to a software application that uses speech recognition techniques to create a transcript of each recording. Also, if synchronization and/or timing information is included in each recorded track, that information can be used, along with the individual transcripts, to create an accurate consolidated transcript of what some or all of the participants said during the conference call.

Figure 8:
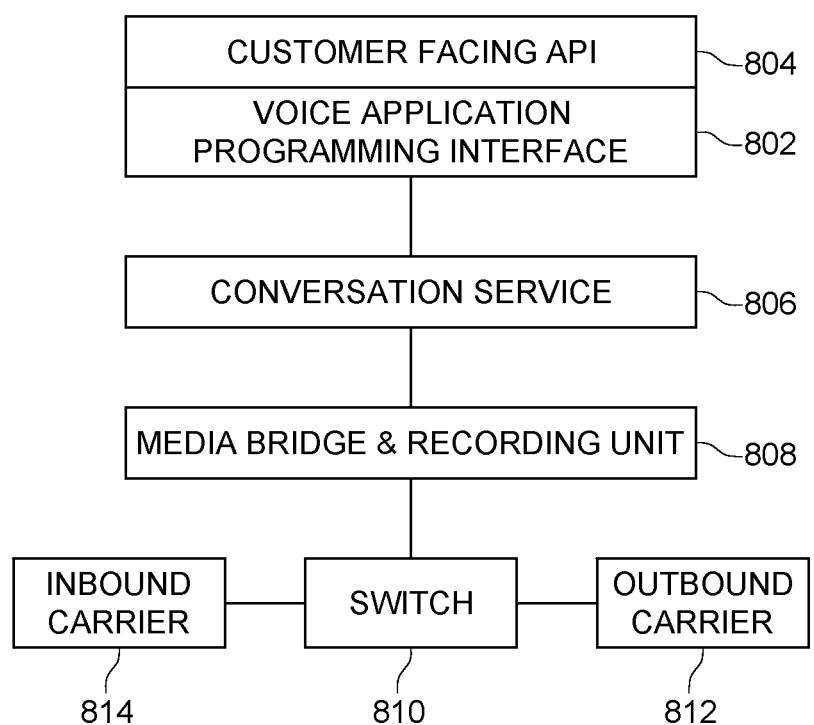
FIG. 8 is a diagram of a second communications environment which could be utilized to perform methods embodying the invention.

FIG. 8 illustrates a second communications environment 800 in which system and methods embodying the invention could exist. In this environment, an inbound carrier 814 connects incoming audio and/or video calls from end users to a switch 810. The switch 810 is also connected to an outbound carrier 812 that connects outbound audio and video calls to end users.

A voice application programming interface 802 that includes a customer facing application programming interface 804 provides customers with a way to selectively control and request the calling and messaging services they obtain. In the case of communications services, a customer can submit a call control object to the voice application programming interface 802 to request certain services, and to modify existing services. In this context, a customer could submit a call control object that requests the setup of a conference call, and the call control object could include information that specifies how audio of the conference call is to be recorded in a multitrack recording. Details of how call control objects can be used to request telephony and messaging services, and modify those services, are provided in U.S. Pat. No. 9,912,808, the contents of which are hereby incorporated by reference.

When the voice application programming interface 802 receives such a call control object, the voice application programming interface signals a conversation service 806 to request the setup of the requested conference call. The conversation service 806 or the voice application programming interface 802 contacts a media bridge and recording unit 808 to provide instructions about how to configure and setup an appropriate multitrack recording. That information provided to the media bridge and recording unit 808 specifies which call legs connected to the switch via the inbound carrier 814 and/or the outbound carrier 812 are to be recorded in which tracks of the multitrack recording.

The voice application programming interface 802 can also interact with customers in other ways to allow the customers to request and obtain services. Call control objects are just one way that customers can request and control the services they obtain.

The invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 9:
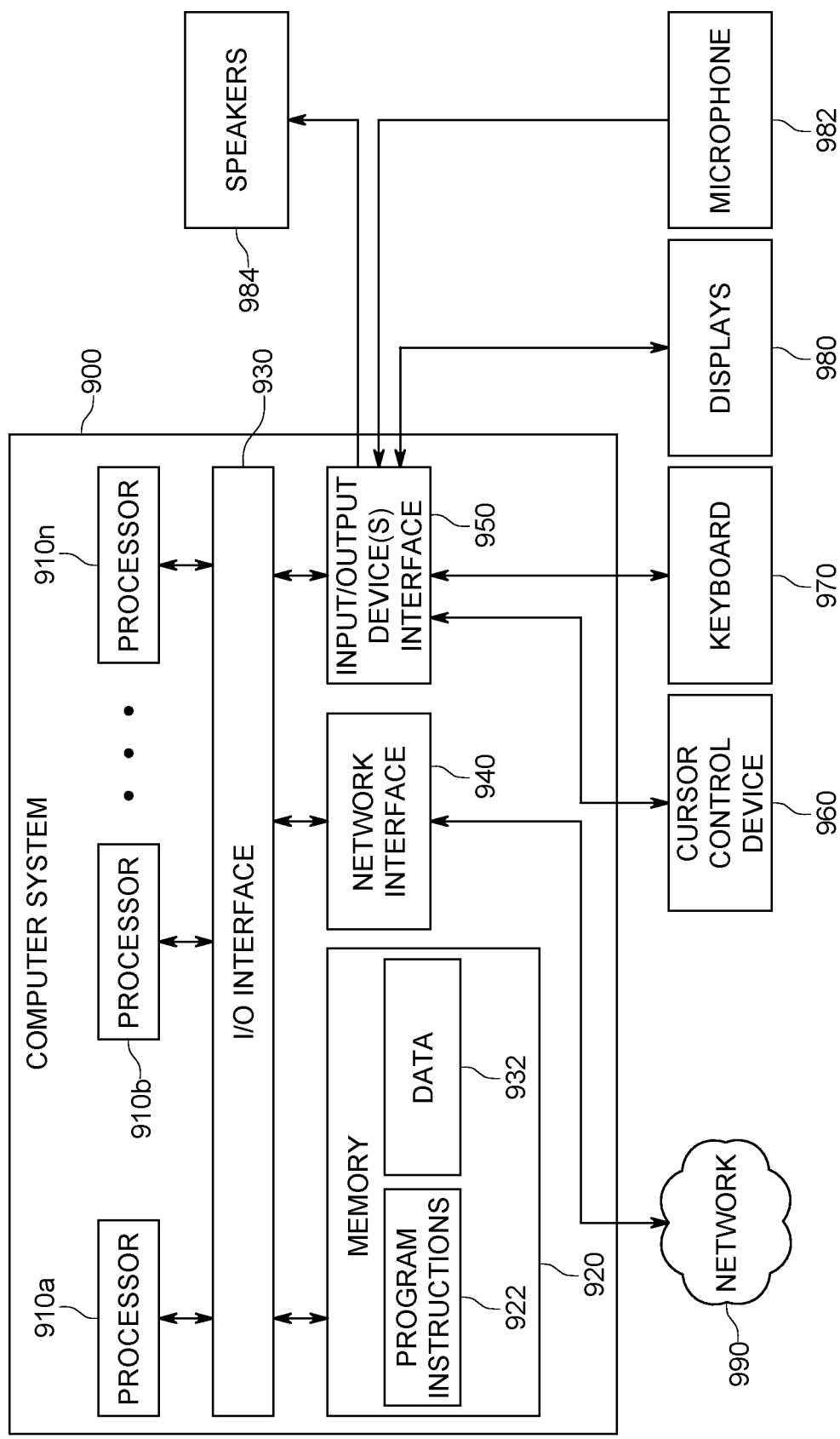
FIG. 9 is a diagram of a computer system and associated peripherals which could embody the invention, or which could be used to practice methods embodying the invention.

FIG. 9 depicts a computer system 900 that can be utilized in various embodiments of the present invention to implement the invention according to one or more embodiments. The various embodiments as described herein may be executed on one or more computer systems, which may interact with various other devices. One such computer system is the computer system 900 illustrated in FIG. 9. The computer system 900 may be configured to implement the methods described above. The computer system 900 may be used to implement any other system, device, element, functionality or method of the above-described embodiments. In the illustrated embodiments, the computer system 900 may be configured to implement the disclosed methods as processor-executable executable program instructions 922 (e.g., program instructions executable by processor(s) 910) in various embodiments.

In the illustrated embodiment, computer system 900 includes one or more processors 910a-910n coupled to a system memory 920 via an input/output (I/O) interface 930. Computer system 900 further includes a network interface 940 coupled to I/O interface 930, an input/output devices interface 950. The input/output devices interface 950 facilitates connection of external I/O devices to the system 900, such as cursor control device 960, keyboard 970, display(s) 980, microphone 982 and speakers 984. In various embodiments, any of the components may be utilized by the system to receive user input described above. In various embodiments, a user interface may be generated and displayed on display 980. In some cases, it is contemplated that embodiments may be implemented using a single instance of computer system 800, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In different embodiments, the computer system 900 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs). In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices interface 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

External input/output devices interface 950 may, in some embodiments, include one or more display terminals, keyboards, keypads, touchpads, scanning devices, voice or optical recognition devices, or any other devices suitable for entering or accessing data by one or more computer systems 900. Multiple input/output devices may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the operations and methods described above, such as the methods illustrated by the flowcharts of FIGS. 4-7. In other embodiments, different elements and data may be included.

Those skilled in the art will appreciate that the computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of recording a telephony communication that involves at least three participants, comprising:
    receiving a command to record a telephony communication that involves the at least three participants, wherein the command specifies that a first participant's contribution to the telephony communication is to be recorded separately from other participants' contributions to the telephony communication;
    establishing a multitrack recording for recording the at least three participants' contributions to the telephony communication;
    recording the first participant's contributions to the telephony communication in a first recording track of the multitrack recording;
    mixing the contributions of at least second and third participants to the telephony communication; and
    recording the mixed contributions of the at least second and third participants' contributions to the telephony communication in a second recording track of the multitrack recording.

2. The method of claim 1, wherein the received command includes information that can be used to identify the contributions provided by the first participant.

3. The method of claim 1, further comprising providing an identification code to the entity that sent the command to record the telephony communication, where the identification code can be used to identify the contributions provided by the first participant.

4. A method of recording a telephony communication that involves multiple participants, comprising:
   receiving a command to record a telephony communication that involves the multiple participants in a multitrack recording having a recording tracks;
   establishing the multitrack recording;
   recording the contributions to the telephony communication provided by the first n−1 participants in respective separate n−1 recording tracks of the multitrack recording;
   mixed the contributions to the telephony communication provided by the remaining participants; and
   recording the mixed contributions of the remaining participants in the nth recording track of the multitrack recording.

5. The method of claim 4, wherein the received command specifies the number of tracks that are to be included in the multitrack recording.

6. The method of claim 4, wherein the received command includes participant identification codes for any participants whose contributions to the telephony communication are to be recorded separately in their own recording track, and wherein the recording step comprises separately recording the contributions to the telephony communication provided by at least the participants corresponding to the participant identification codes in the received command in their own respective separate recording tracks of the multitrack recording.

7. The method of claim 4, further comprising providing first, second and third identification codes for respective first, second and third participants to the entity that sent the command to record the telephony communication, where the first, second and third identification codes can be used to identify the contributions provided by the first, second and third participants.

8. A system for recording a telephony communication that involves multiple participants, comprising:
   means for receiving a command to record a telephony communication that involves the multiple participants in a multitrack recording;
   means for establishing the multitrack recording; and
   means for recording the contributions to the telephony communication provided by the first n−1 participants in respective separate n−1 recording tracks of the multitrack recording;
   mixed the contributions to the telephony communication provided by the remaining participants; and
   recording the mixed contributions of the remaining participants in the nth recording track of the multitrack recording.

9. A system for recording a telephony communication that involves multiple participants, the system comprising one or more processors configured to perform a method comprising:
   receiving a command to record a telephony communication that involves the multiple participants in a multitrack recording; and
   establishing the multitrack recording; and
   recording the contributions to the telephony communication provided by the first n−1 participants in respective separate n−1 recording tracks of the multitrack recording;
   mixed the contributions to the telephony communication provided by the remaining participants; and
   recording the mixed contributions of the remaining participants in the nth recording track of the multitrack recording.

10. The system of claim 9, wherein the received command specifies the number of tracks that are to be included in the multitrack recording.

11. The system of claim 9, wherein the received command includes participant identification codes for any participants whose contributions to the telephony communication are to be recorded separately in their own recording track, and wherein the recording step comprises separately recording the contributions to the telephony communication provided by at least the participants corresponding to the participant identification codes in the received command in their own respective separate recording tracks of the multitrack recording.

12. The system of claim 9, wherein the method further comprises providing first, second and third identification codes for respective first, second and third participants to the entity that sent the command to record the telephony communication, where the first, second and third identification codes can be used to identify the contributions provided by the first, second and third participants.

* * * * *